United States Patent

[11] 3,631,378

[72] Inventor Benjamin C. Ellis, Jr.
Baltimore, Md.

[21] Appl. No. 69,511
[22] Filed Aug. 10, 1970
[45] Patented Dec. 28, 1971
[73] Assignee Bell Telephone Laboratories, Incorporated
Murray Hill, Berkeley Heights, N.J.
Original application Dec. 27, 1968, Ser. No. 787,453. Divided and this application Aug. 10, 1970, Ser. No. 69,511

[54] WIRE-CONNECTING BLOCKS
1 Claim, 19 Drawing Figs.

[52] U.S. Cl. .......... 339/125 R, 339/198 GA
[51] Int. Cl. .......... H01r 13/42
[50] Field of Search .......... 339/91, 95, 97–99, 125, 198

[56] References Cited

UNITED STATES PATENTS

| | | | |
|---|---|---|---|
| 3,087,984 | 4/1963 | Waranch .......... | 339/198 GA |
| 3,496,522 | 2/1970 | Ellis, Jr. et al. .......... | 339/99 R |

*Primary Examiner*—Joseph H. McGlynn
*Attorneys*—R. J. Guenther and Edwin B. Cave

ABSTRACT: This disclosure describes an indexing strip and connecting block scheme for equipment and station interconnections for key telephone systems. The indexing strip is a plastic molding with two narrowly spaced rows of teeth. The insulated line wires are placed across the slots between the teeth. The connecting block straddles the teeth and its pin connectors are each guided into piercing contact with a respective wire. The blocks and strips lock, once engaged. Wall mountings for the strips include bases with V-shaped insertion tracks.

INVENTOR
B. C. ELLIS, JR.
BY Edwin B. Cave
ATTORNEY

WIRE-CONNECTING BLOCKS

This is a division of application Ser. No. 787,453, filed Dec. 27, 1968.

This invention relates to interconnections between a multiplicity of wires; and particularly to connections between the telephone lines, and the stations and equipment of a key telephone system.

BACKGROUND OF THE INVENTION

In the B. C. Ellis, Jr. et al. U.S. Pat. No. 3,496,522 and assigned applicant's assignee, there is described a versatile, inexpensive and simple wire-connecting or indexing strip and connecting block configuration particularly useful in key telephone system wiring arrangements. In that scheme, wires of specific telephone lines are disposed across an indexing strip and station connections to them are made by connector blocks that include insulation-piercing pin connectors.

The present invention, while similar in general principle, improves in several important respects upon the specific design and configuration of the indexing strips and associated connector blocks.

For example, the combs of the earlier indexing strip were widely spaced and the wires supported therein thus spanned a relatively wide groove. This allowed wire slack to occur or develop with a significantly increased risk of wire misalignment with the pin connectors of the block. The wide groove design further required more labor for wire installation. The connectors of the block also were staggered, making for a relatively wide connector block.

Additionally, the earlier design was found to require more space than strictly necessary for support of, and electrical connection to, the telephone line wires.

A further problem with the foregoing and other connector block and strip arrangements is the manner of interlocking the block and the strip. It is desirable to ensure that the block, once applied to the strip, stays in place. In earlier arrangements, this feature was difficult to achieve with simplicity.

Accordingly, the principal object of the invention is to further improve the mechanisms by which changes and rearrangements are made in a telephone key system wiring pattern.

A further object of the invention is to reduce the space needed for such an arrangement.

A further object of the invention is to avoid disrupting service when undertaking rearrangements in key system wiring.

A further object of the invention is to achieve a key telephone system modular wiring scheme that provides space for wires and cables, and also permits rapid and orderly installation and growth of terminal arrays.

A still further object of the invention is to expeditiously store and readily identify groups of wires representing key telephone system circuit functions until interconnection is required.

SUMMARY OF THE INVENTION

These objects are broadly realized in an indexing strip and connector block configuration in which the intermediate structure between the index strip teeth is substantially eliminated, bringing the teeth directly adjacent each other. In one embodiment, each pair of corresponding teeth are held in separation by a strength element that extends beyond the base of the strip.

In accordance with one feature of the invention, the pin connectors of the connecting block are arranged in a single line; and importantly, will accommodate to any part of the index strip and not merely discrete sections thereof.

Once installed, each block is locked pursuant to another aspect of the invention by the engagement of each separate tooth to the block through a nub projection and indentation arrangement. When so engaged, the block can only be removed with mechanical aid.

Each index strip further is advantageously of a unitary one-piece mold; and includes an inverted V-groove in the base bottom to facilitate mounting strips in an underlying mounting plate equipped with the like grooves.

Compact multiple appearances of a given telephone line or line are achieved pursuant to the invention by arraying a number of such strips so that the line wires are successively disposed between the corresponding teeth of each strip. Each connector block is placed on a different indexing strip but connected to the same telephone line; and thus its connection is independent of the other blocks.

DETAILED DESCRIPTION OF AN ILLUSTRATIVE EMBODIMENT

Figure 1:
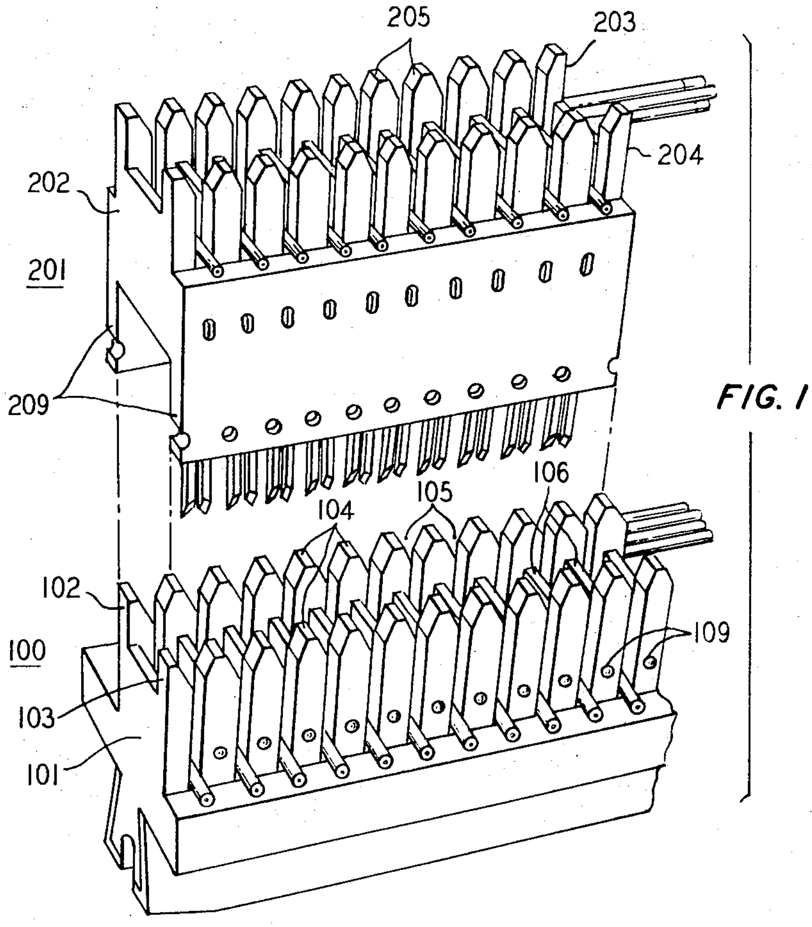
FIG. 1 is a perspective side view of a portion of an indexing strip, and a full connector block.
Figures 2, 2A, 2B, 2C, 2D:
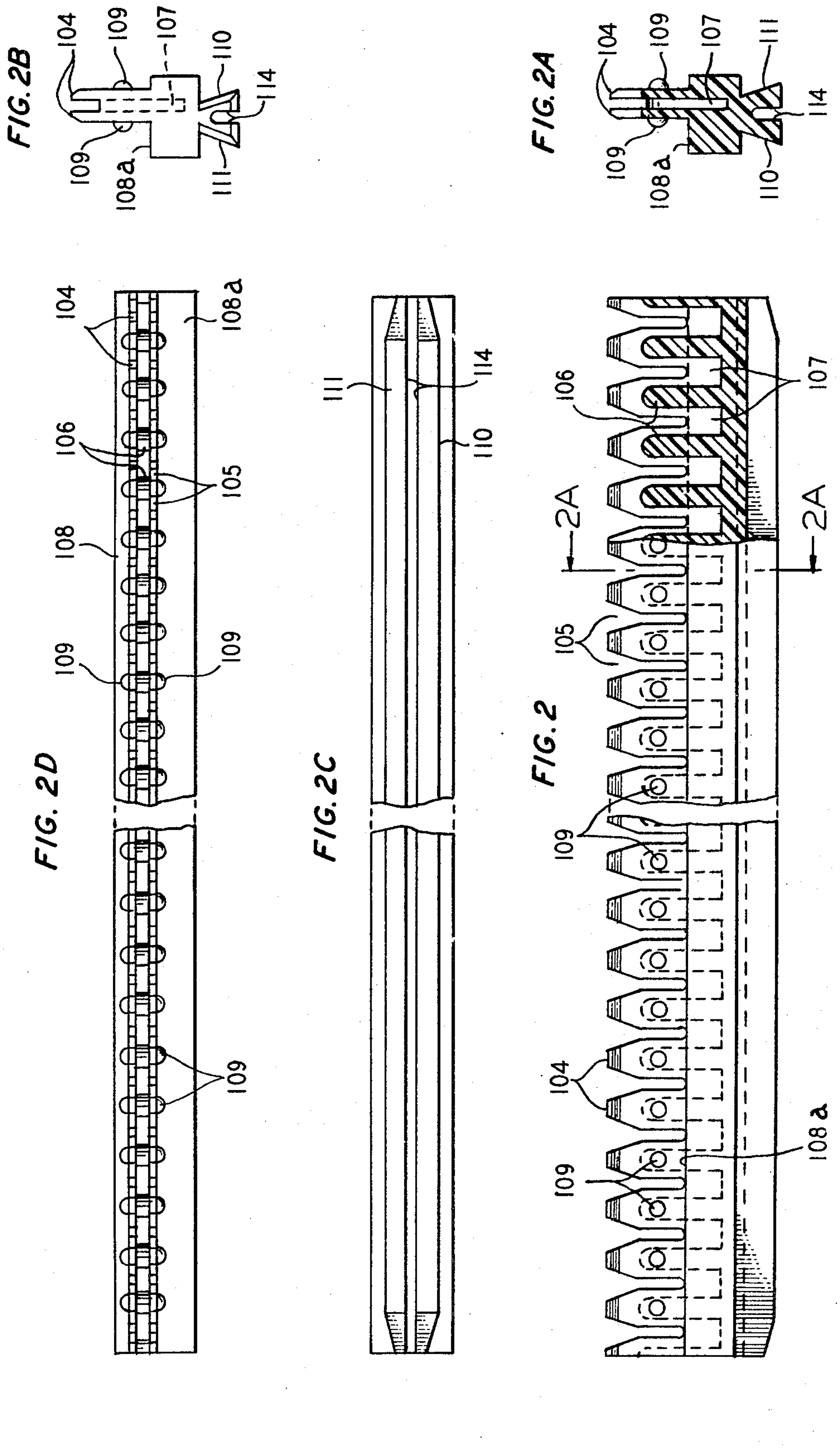
FIGS. 2, 2A, 2B, 2C, and 2D are side, end sectional, end, bottom, and top views respectively of the indexing strip.

As seen in FIG. 1, the invention advantageously is embodied in an index strip 100 and an associated connector block 201. Strip 100 consists of a base block 101 with sidewalls 102, 103, each wall comprising an in-line row of identical teeth 104. Between all adjacent teeth in both rows are spaces of like size, which function as fanning slots 105. Corresponding pairs of teeth 104 of the two sidewalls are connected by separators 106 from a point below the teeth 104 ends. Each adjacent two separators together with the four associated teeth 104, form a well 107 whose bottom is below the index strip floor 108, as seen in FIG. 2A. The wells 107 are centered under the fanning slots 105.

Figure 6:
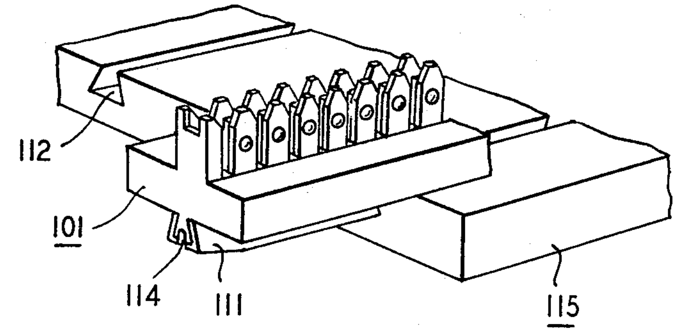
FIG. 6 is a perspective diagram of an index strip and its mounting base.

Each tooth 104 includes an outer nub 109 seen in FIGS. 2, 2A, and 2B, for example. Nubs 109 are positioned below the tops of separators 106; and, as will be described, serve to lock connector blocks 201 to the index strip. The index strips 100 include slanted legs 110 and 111 which as seen in FIG. 6 engage a like-shaped V-groove 112 in a mounting plate 113. A slot 114 between the legs provides means for adjusting the frictional gripping properties of legs 110 and 111.

Figure 3C:
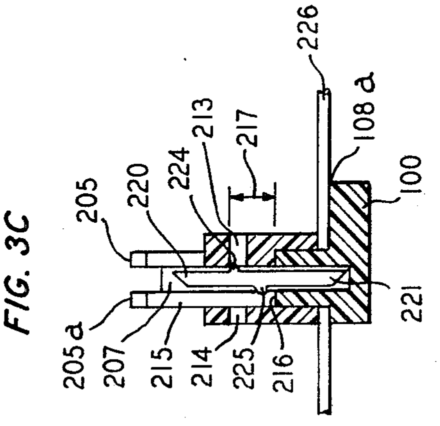
FIGS. 3, 3A, 3B, and 3C are front, top, side, and side sectional views of the connector block.

As seen in FIGS. 2A and 3C, for example, the index strip teeth 104, pursuant to one facet of the invention, are placed to one side of the base block floor 108 thus affording a relatively wide side designated **108*a* of floor 108. The purpose of wide side 108*a* is to afford a platen sufficiently wide to trim off the wires in one stroke with a hand-cutting tool having a circular rolling cutter. A result of such a cut is shown, for example, in FIG. 7. The legs 110, 111 run the entire length of the index strip, as seen in FIG. 2C. Similarly, as shown in FIG. 3D, the teeth 104** are disposed as described along the entire length of the index strip.

Figure 5:
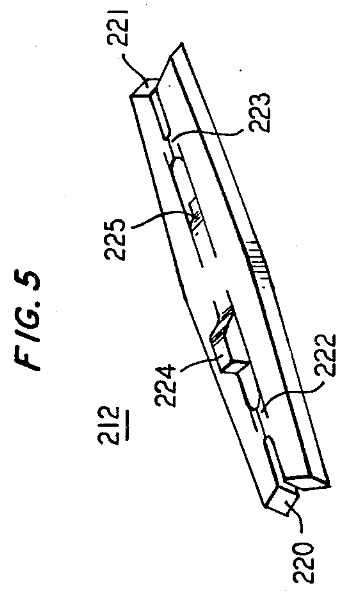
FIG. 5 is a side perspective sketch of the pin connector used in the blocks.

The connector block 201 consists of a body 202 and a pair of sidewalls 203, 204 extending from the body top. Each sidewall consists of a row of teeth 205 of like size, shape, and spacing as teeth 104 of index strip 100. The teeth 205 are spaced as shown in FIGS. 3 and 3A, the spaces therebetween defining fanning slots 206. Each pair of corresponding teeth 104 is joined by a separator 207. Adjacent separators 207, together with associated teeth 205 define an upper cavity 208 which houses one end of a pin connector 212 such as shown in FIG. 5.

Pin connector 212 includes beveled tapered ends 220, 221 which are formed by a coining trim tool into sharp insulation-piercing edges, and corresponding slots 222, 223 which receive and grip a wire. Pin connector 212 is formed with mounting arms 224, 225 extending from opposite faces. Pin connectors 212 are capable of making a permanent, low-resistance, gastight connection to insulated conductors without prior stripping of the insulation. Also, because of their resilient nature, they may be used repeatedly.

As seen in FIG. 3C, connector blank 201 includes a row of oblong locking slots 213 which are centered directly beneath each fanning slot 206. Slot 214 which is opposite to locking slot 213 is for the purpose of inserting an extracting tool if it should be necessary to disengage pin 212 from its mounting; or for inserting a probe to aid in engaging appendage 224 into locking slot 213.

Figure 3B:
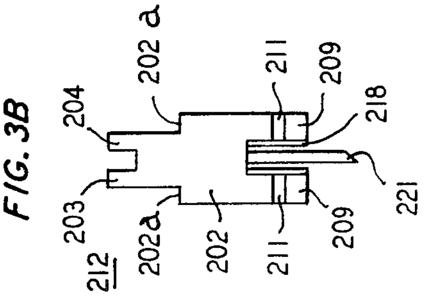
Figure 3A:
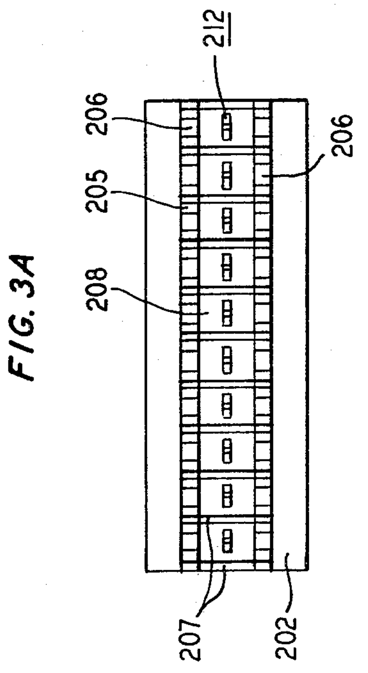
Figure 3:
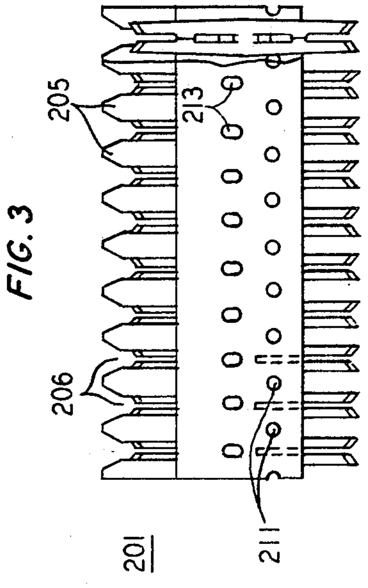

As seen in FIGS. 3 and 3B, each connector block leg includes inwardly directed vertical guide members 218, which are in alignment with the fanning slots 206. The guide members 218 engage the index strip fanning slots 105 when the block is placed upon the strip.

Pursuant to one facet of the invention, the teeth on one side of connector block 201 such as teeth 205*a* of FIG. 3C form with their adjacent downwardly extending sides a series of pin grooves 215 that terminate at groove base 216. The pin connector 212 is installed by placing same into upper cavity 208 until the arm 224 clears slot 213 and locks thereinto. At this point the arm 225 on the other side of pin connector 212 is approximately in contact with the groove base 216. A slight clearance of, for example, 5 mils is provided between the vertical distance between the flat portions of arms 224, 225 and the distance designated 217 between the top of slot 213 and the groove base 216.

When in place, the point of pin connector 212 is substantially level with the top of separator 207, as seen in FIG. 3C. The bottom end 221 of pin 212 extends beyond the base of legs 209 as seen in FIG. 3B, by an amount sufficient to engage a wire 226 placed in the fanning slots 103 of index strip 100, as shown in FIG. 3C.

Figure 7:
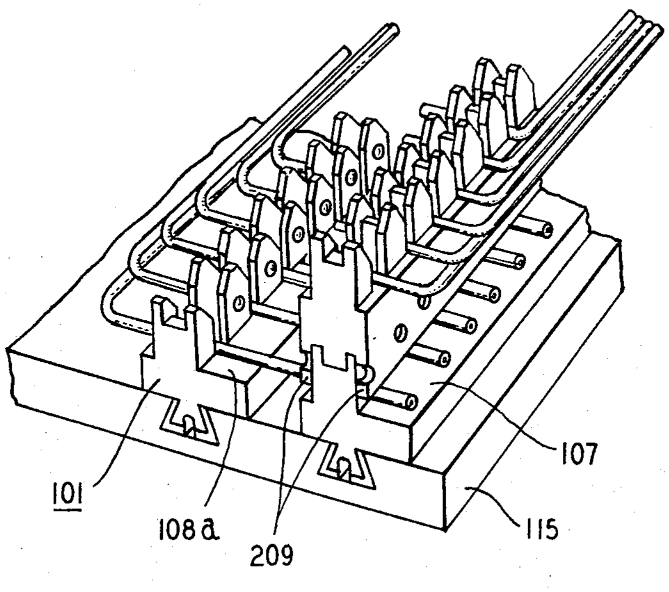
FIG. 7 is a perspective diagram of indexing strips mounted in a base and wired for multiple line appearances.

A row of cylindrical slots 211 shown in FIGS. 3 and 3B placed through the legs 209 serve to capture the nubs 109 molded into the teeth 104. Nubs 109 and slots 211 are arranged to mate at a point where the base of legs 209 affect a clearance with the floor 107 of the indexing strip 100 as shown in FIG. 7, for example.

Figures 4, 4B:
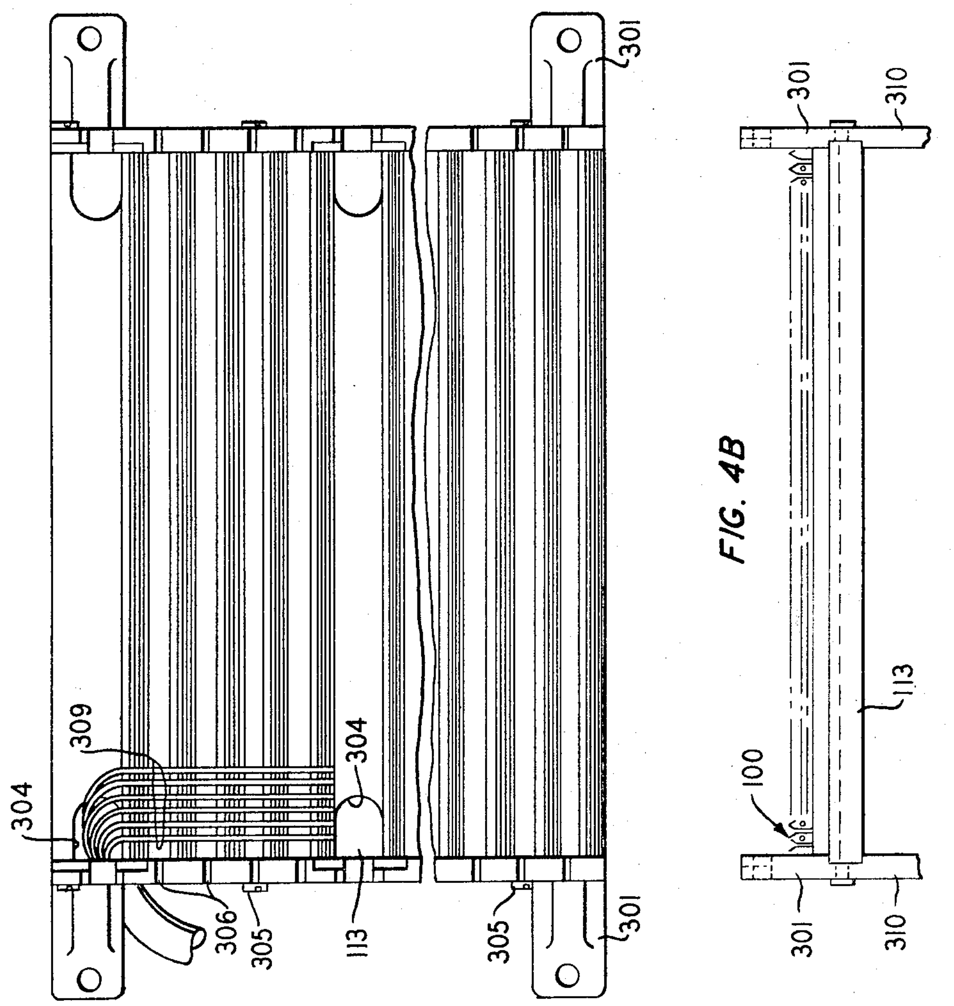
FIGS. 4, 4A, and 4B are top, side, and front views respectively of a mounting scheme for the index strips.
Figure 4A:
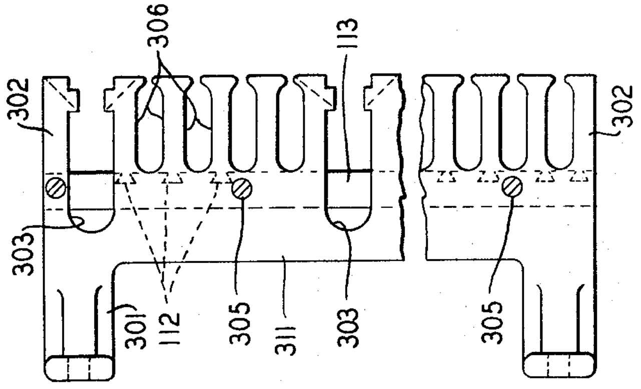

FIGS. 4, 4A, and 4B depict a preferred means for mounting the index strips 100. A pair of brackets 301 mountable on a vertical background, not shown, comprise legs 310 joined by a flange 311 that includes a top fanning strip 302. The latter consists of several fanning slots 306 and periodic wire guide slots 303, which extend well down into flange 311. An index strip mounting plate 113 is supported by fasteners such as 305 between the flanges 311 and at a level that clears the bottom of each guide slot 303 as seen in FIG. 4A. Mounting plate 113 is formed with guide slots 304 as seen in FIG. 4 which correspond in position to the guide slots 303 in the fanning strip 302.

Mounting plate 113 is provided with spaced parallel V-grooves 112 as seen in FIG. 6 which accommodate the slanted legs of each index strip as already described. The grooves 112 are spaced so as to correspond with respective ones of the fanning slot 306 as seen in FIG. 4A. The index strips are held in place in the V-grooves 112 by virtue of the resiliency afforded the legs 110, 111 by the notch 114.

Figure 8:
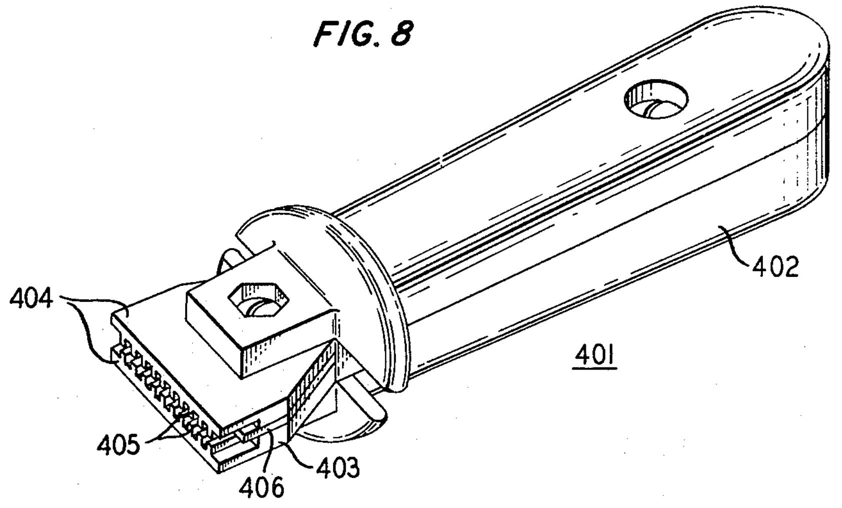
FIGS. 8, 8A, and 8B are perspective, frontal, and side views respectively of a seating tool.
Figure 8A:
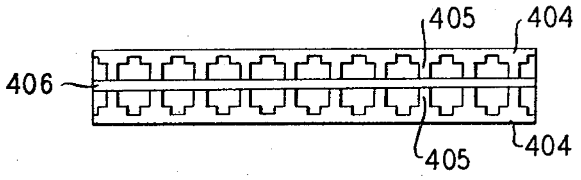
Figure 8B:
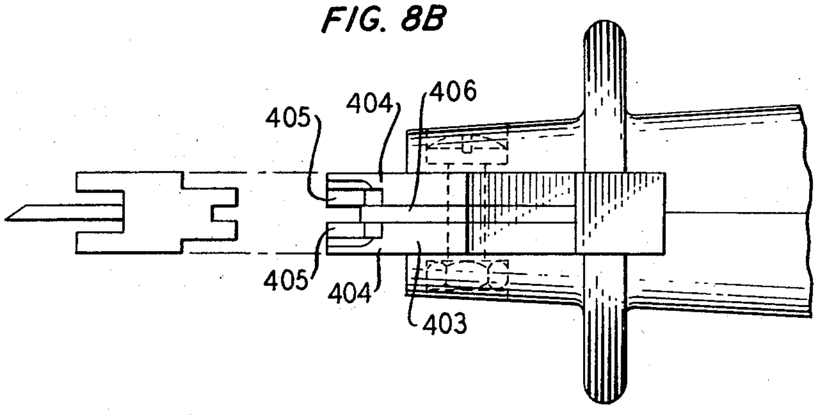

Wires are installed in the fanning slots 105 of strip 100 as well as in the fanning slots 206 of connector block 201, advantageously by means of the seating tool 401 shown in FIG. 8. This tool consists of a handle 402 and a seating head 403. The head 403 consists of a pair of side ribs 404 which as shown in FIG. 8B engage the top portions 202*a* of body 202. A series of internal rib pairs 405 are disposed in spaced array between the ribs 404. The spacing corresponds to the space between fanning slots 105 as seen in FIG. 2. The ends of ribs 405 and or 404 are coplanar as seen in FIG. 8.

Wires are snubbed into the fanning slots 105 and thereafter seated by applying the head across the teeth 104 which guide the ribs 405 downwardly unto the wires, firmly seating them across the bottoms of the fanning slots 105. As a tool for seating wires into the ends 220 of connector block pin 212, the center rib 406 of head 403 comes into play as shown in FIG. 8B.

OPERATION

As seen in FIG. 4, a group of wires associated with specific telephone lines are selected out from a cable (not shown) and led through the slots 303, 304. Thereafter, the wires 309 are dressed across a group of, for example, five index strips 100 in the manner illustrated in FIG. 7. The wire-connecting strip 100 provides a means of storing wires in a prearranged sequence for identification purposes. When circuit connections are required the connecting block equipped with the proper number of connectors is inserted into the connecting strip. Connections to all wires required for the circuit connection are made simultaneously. Cross-connecting wires are then inserted in the top of the connecting block.

The connecting blocks may be inserted anywhere along the connecting strips and may be provided in sizes of, for example, up to 10 pin connectors 212 per connecting block. By having this flexibility available, any changes in application or number of wires per circuit group may be accommodated.

The interlock of strips 100 and connector blocks 201 provides mechanical rigidity necessary to withstand field handling, and inadvertent removal of connecting blocks during wire work in the terminal arrangement.

Connecting blocks are installed only as customer service is required. Investment thus is only made in connectors which return revenue. When service is discontinued, it is not necessary to remove the connecting block but only the expendable cross-connecting wires terminated on the top of the connecting block.

The invention has been described principally in connection with insulated conductor, but it should be clear that it applies equally to connections between bare wires. The multiple-appearance wires of FIG. 7, for example, might in given applications be uninsulated conductor. The inventive structure described does not change for those applications.

The invention is embraced in spirit within the claims to follow which define its scope.

1. Apparatus for interconnecting a plurality of groups of wire comprising in combination: an insulative indexing strip comprising a body portion with a flattop floor, two parallel rows of corresponding teeth, the teeth in each row spaced apart to form fanning slots, the corresponding teeth pairs being held in close proximity by separators, each separator rising from a level below said top floor and terminating below the ends of said teeth, adjacent said separators and their respective teeth forming a well; and a connector block comprising a body member with a flattop floor, two rows of corresponding teeth extending vertically from said floor, the teeth in each row being spaced by amounts equal to the spacing between the teeth in said index strip; corresponding ones of the teeth in said connector block rows being joined in a narrow spacing by a separator; said block body further comprising a groove formed by the sides of said teeth in a first one of said teeth rows, said groove culminating in a base below said floor level; said block further comprising a top row of oblong locking slots disposed directly beneath the fanning slots formed by said teeth row opposite to said first teeth row; a connector pin comprising first and second beveled and tapered insulation-piercing ends, and first and second oppositely directed arms extending from opposite faces of said pin; the arms of each said pin engaging respectively the said groove base and said oblong slot above said base thereby to lockably engage in said connector; the top end of each said pin being disposed below the tops of said connector block teeth, and the bottom end of each said pin protruding beyond said connector block body; and said body further comprising first and second legs spaced apart, each said leg including an inwardly directed vertical guide member, said guide members engaging the index strip fanning slots when said block is placed upon said strip, and further comprising a bottom row of cylindrical slots through each said leg of said connector block, said bottom slots being spaced to align with the centers of said index strip teeth when said block is on said strip; and said index strip teeth each further including an outwardly extending nub for engagement with said connector block bottom slots, engagement occurring when the bottom ends of said connector block legs are spaced slightly above the top floor of said index strip, and each index strip further comprises first and second outwardly slanting legs running the entire length of said strip; and wherein said apparatus further comprises a baseplate with inverted V-grooves in parallel relation adapted to receive said strip legs; first and second baseplate mounting brackets each said bracket comprising a pair of legs and an upwardly extending flange; and each flange including a fanning strip and a plurality of downwardly extending spaced guide slots extending between below the level of said baseplate, said baseplate further comprising a plurality of inwardly extending guide slots in alignment with the guide slots of said flange, the base slots and corresponding flange slots being adapted to receive telephone line wires for dressing across the teeth of said index strips mounted in said baseplate.

* * * * *